(12) United States Patent
Foster

(10) Patent No.: US 7,621,633 B1
(45) Date of Patent: Nov. 24, 2009

(54) REVERSIBLE EYEWEAR AND ASSOCIATED METHOD

(76) Inventor: Valerie Foster, 312 Otterbein St., Baltimore, MD (US) 21230

(*) Notice: Subject to any disclaimer, the term of this patent is extended or adjusted under 35 U.S.C. 154(b) by 0 days.

(21) Appl. No.: 12/221,376

(22) Filed: Aug. 1, 2008

Related U.S. Application Data

(60) Provisional application No. 60/963,373, filed on Aug. 6, 2007.

(51) Int. Cl.
G02C 11/02 (2006.01)
(52) U.S. Cl. .......................... 351/51; 351/52; 351/116; 351/153; 16/228
(58) Field of Classification Search .................. 351/41, 351/51, 52, 111, 116, 153; 16/228
See application file for complete search history.

(56) References Cited

U.S. PATENT DOCUMENTS 5,185,620 A * 2/1993 Cooper ........................ 351/52

* cited by examiner

Primary Examiner—Huy K Mai

(57) ABSTRACT

A modular eyeglass frame may include a lens frame and a plurality of handles with oppositely facing first and second sides. Each side may include unique surface indicia. A mechanism for interchangeably connecting the handles to the lens frame may further be included. A coupling may be attached to a proximal end of one of the handles. Helical spring members may be mated to the coupling at one end and may include a bearing at another end. Receiving blocks may be attached to the lateral ends of the lens frame and may feature sockets formed in an inner wall thereof, to receive each bearing. Grooves may be formed in lateral sides of the receiving blocks. Such grooves may be effectively axially aligned with locking arms such that the locking arms are interfitted inside the grooves when the coupling is interfitted between the receiving blocks.

15 Claims, 2 Drawing Sheets

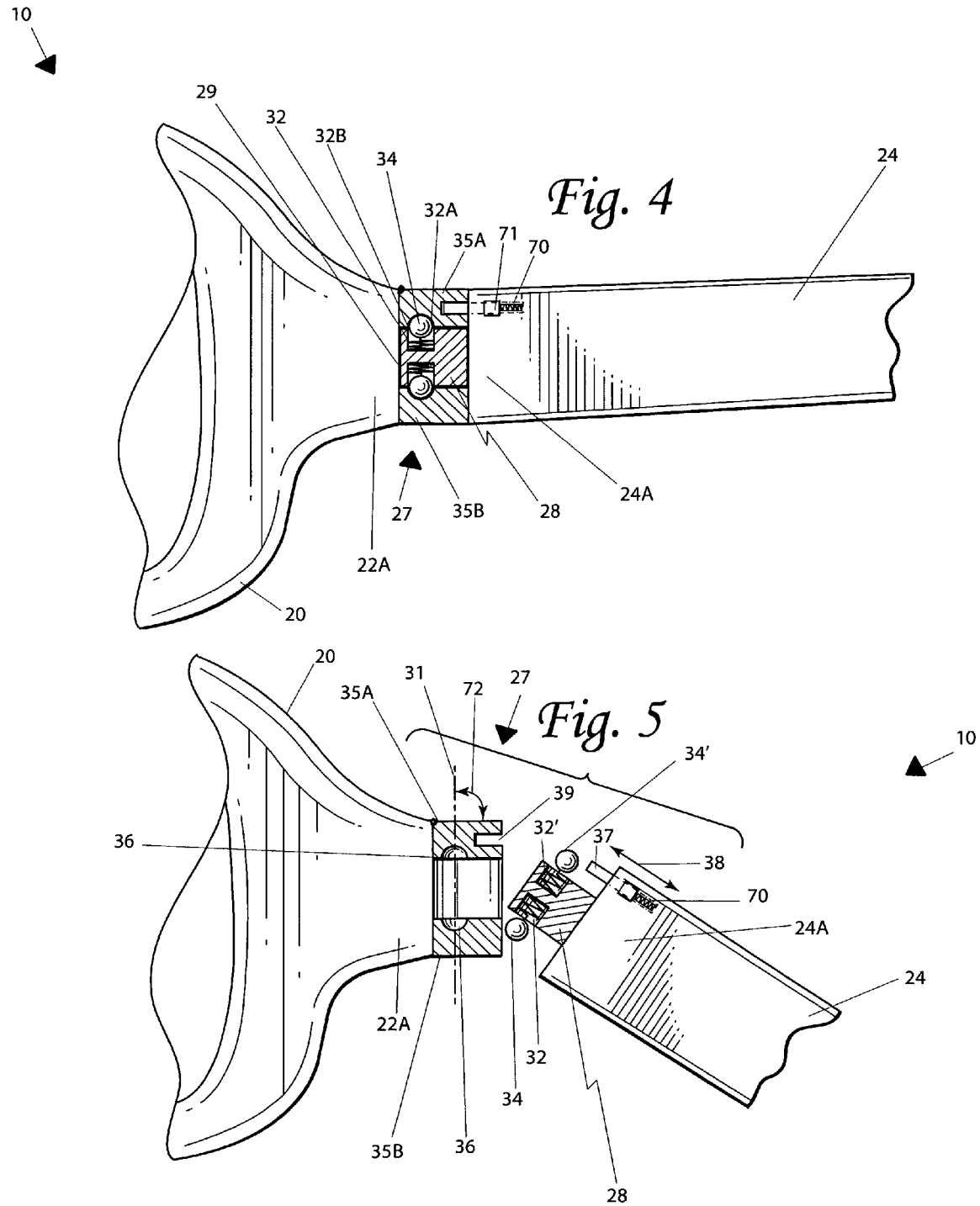

REVERSIBLE EYEWEAR AND ASSOCIATED METHOD

CROSS REFERENCE TO RELATED APPLICATIONS

This application claims the benefit of U.S. Provisional Application No. 60/963,373, filed Aug. 6, 2007, the entire disclosures of which are incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to eyewear and, more particularly, to a modular eyeglass frame for allowing a user to selectively alter an appearance thereof.

2. Prior Art

As we grow older it is not uncommon for our eyesight to deteriorate, thus resulting in a lot of people needing to get glasses as they grow older. This occurrence is not just limited to the older generation; many younger persons also require assistance from glasses to improve their eyesight. Thus there is a rather large portion of the population that requires corrective lenses to assist and improve their vision. Typical glasses consist of a pair of lenses that are mounted in a frame that rests on a person's nose and their ears, thus conveniently allowing a person to use their hands for other tasks. The frame that the lenses are mounted in is typically one specific color, like black, or has a design, like tortoise shell. The disadvantage is that a person may become tired of their lens frame, and the only way to get a new frame is to get a new pair of glasses, which can become rather expensive.

U.S. Pat. No. 6,530,660 to Chao discloses eyeglasses provided with at least one reversible arm that can be manipulated to fold in towards the outer (front) face of the lens retaining portion of the frame, thereby covering it. The arm can be attached to the frames in a variety of ways. For instance, the attachment can be mechanical, or magnetism may be employed in fixing the arm to the frame. Several structural arrangements are described that permit reversal of the arm from a position behind the lens retaining portion of the frame to a position in front thereof. The arm can then be folded to cover the front and back sides of the lenses. Unfortunately, this prior art example fails to provide a fully reversible frame featuring different colors or designs on opposite sides.

U.S. Pat. No. 4,787,731 to Rogers discloses a reversible eyeglass structure having an ear piece support assembly pivotally connected through a hinge connector assembly to an eyeglass frame assembly. The eyeglass frame assembly resembles a normal eyeglass assembly except that the glass sections and the main frame assembly are extended in parallel planes so that the eyeglass lens can be view through reversed directions and a nose bridge member can be used on a person's nose portion in opposite directions. The ear piece support assembly includes a pair of ear piece support members which are constructed in half sections with exterior surfaces of different colors and/or designs. The ear piece support members are pivoted 180 degrees to effectively present two sets of different appearing eyeglass wear in the one reversible eyeglass structure. The hinge connector assembly provides for ear piece and frame connector assemblies interconnected by a pin connector assembly and including biasing means to hold the ear piece support members in both usage conditions. Unfortunately, this prior art example includes extra detachable elements that may be easily lost by the user, rendering the invention function less.

U.S. Pat. No. 5,640,217 to Hautcoeur discloses an eyeglass frame wherein one of the components such as the temples, the bridge and/or the connection bar between the eye wires is made of a shaped memory alloy which is able to regain its initial shape by simple heating after having undergone a permanent deformation and a lower temperature. Unfortunately, this prior art example does allow the user to changer the color of the eyeglass frames by reversing the legs of the frames.

Accordingly, a need remains for a modular eyeglass frame in order to overcome the above-noted shortcomings. The present invention satisfies such a need by providing a device that is convenient and easy to use, is durable yet lightweight in design, is versatile in its applications, and provides users with a simple means of extending their eyewear versatility.

BRIEF SUMMARY OF THE INVENTION

In view of the foregoing background, it is therefore an object of the present invention to provide a device for allowing a user to selectively alter an appearance of their eyeglasses. These and other objects, features, and advantages of the invention are provided by a modular eyeglass frame.

A modular eyeglass frame for allowing a user to selectively alter the appearance thereof may preferably include a lens frame. Such a lens frame may have oppositely facing first and second sides spanning along an entire longitudinal length of the lens frame respectively and terminating at oppositely disposed first and second lateral ends of the lens frame respectively. Each of such first and second sides may include unique surface indicia displayed thereon respectively.

The modular eyeglass frame may also include a plurality of elongated handles. Each of such elongated handles may feature oppositely facing first and second sides spanning along an entire longitudinal length of the handles respectively. The handles and each handle of the present invention are referred to interchangeably as a user may attach each handle to either the first or second lateral end of the lens frame according to the user's preference. For purposes of this application, it should be noted that each handle may operate in a similar manner. Each of such first and second sides of the handles preferably includes unique surface indicia displayed thereon respectively. The modular eyeglass frame may be selectively morphed between a plurality of modes defined by alternate combinations of the unique surface indicia associated with the lens frame and the handles respectively.

The modular eyeglass frame may include a mechanism for interchangeably connecting each of the handles to each of the first and second lateral ends of the lens frame respectively such that the unique surface indicia of each of the first and second sides of the lens frame may be selectively coordinated with the unique surface indicia of each of the first and second sides of the handles respectively. It should be noted that the interchangeably connecting mechanism is preferably included on each of the first and second lateral ends of the lens frame. Thus, one ordinarily skilled in the art will understand that any reference to the interchangeably connecting mechanism attached to one of the lateral ends, shall also be true for another one of the lateral ends of the present invention.

The interchangeably connecting mechanism preferably includes a coupling which is advantageously attached to a corresponding proximal end of a first one of the handles. Such a coupling preferably includes a cylindrical cam formed at a leading end thereof. Such a cam may be directly and rotatably abutted against the first lateral end of the lens frame as the first handle is biased along the first arcuate path to thereby prevent the first handle from undesirably deviating away from the fulcrum pivot axis during rotation.

The interchangeably connecting mechanism may further include a first plurality of deformably resilient helical spring members. Such a first plurality of spring members may include first ends statically mated directly to the coupling respectively. The first plurality of spring members may also include second ends and follow mutually exclusive compression paths. A plurality of bearings may be fixedly attached to second ends of the first plurality of spring members respectively.

The interchangeably connecting mechanism may further include a plurality of receiving blocks. Such receiving blocks may be attached directly to the first and second lateral ends of the lens frame respectively. Each of the receiving blocks may feature a socket formed in an inner wall thereof. The bearings may be slidably interfitted into the sockets when the coupling is intercalated between the receiving blocks such that the first handle is freely rotated about a fulcrum pivot axis juxtaposed parallel to the first lateral end of the lens frame. The spring members are preferably suitably calibrated to exert equal and opposite linear forces when compressed such that the bearings advantageously maintain frictional surface contact with the sockets and thereby prevent the coupling from disengaging the first lateral end of the lens frame.

The interchangeably connecting mechanism may further include a locking arm. Such a locking arm may preferably be retractably engaged with the proximal end of the first handle. The locking arm may also be reciprocated along a linear path oriented perpendicular to mutually exclusive compression paths of the spring members respectively. Such a locking arm may be mated to an auxiliary spring member. Such an auxiliary spring member may be resiliently compressible along a linear path defined orthogonal to the fulcrum pivot axis. The locking arm preferably exerts an opposing force acting against a corresponding one of the linear forces of the spring members and thereby prohibit the coupling from prematurely disengaging the receiving blocks.

The interchangeably connecting mechanism may further include a groove formed along a lateral perimeter of the first one of the receiving blocks respectively. Such a groove may be effectively axially aligned with the locking arm such that the locking arm is interfitted inside the groove when the coupling is interfitted between the receiving blocks.

The first receiving block may be pivotally attached to the first lateral end of the lens frame. The first receiving block may also be freely pivotal between open and closed positions when the first locking arm is disengaged from the groove and thereby permitting a first one of the spring members to expand to equilibrium such that a first one of the bearings disengages from the first receiving block. A second receiving block may be statically and fixedly connected to the first lateral end of the lens frame.

A method for allowing a user to selectively alter an appearance of a modular eyeglass frame may include the first step of providing a lens frame with oppositely facing first and second sides spanning along an entire longitudinal length of the lens frame respectively and terminating at oppositely disposed first and second lateral ends of the lens frame respectively. Each of the first and second sides may also include unique surface indicia displayed thereon respectively. The method may include a second step of providing a plurality of elongated handles. Each of the elongated handles may have oppositely facing first and second sides spanning along an entire longitudinal length of the handles respectively. Each of the first and second sides of the handles including unique surface indicia displayed thereon respectively.

The method may include a third step of selectively morphing the appearance of the modular eyeglass frame between a plurality of modes. Each mode is preferably defined by alternate combinations of the unique surface indicia associated with the lens frame and the handles performing the step of interchangeably connecting each of the handles to each of the first and second lateral ends of the lens frame respectively so that the unique surface indicia of each of the first and second sides of the lens frame is selectively coordinated with the unique surface indicia of each of the first and second sides of the handles respectively.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

FIG. 4 is an enlarged cross sectional view of the interchangeably connecting mechanism showing the coupling fitted into the receiving blocks when the handle is attached to the lens frame, taken from line 4-4, as seen in FIG. 3; and FIG. 5 is the enlarged cross sectional view of FIG. 4, showing the coupling detached from the receiving blocks when the handle is unattached from the lens frame.

DETAILED DESCRIPTION OF THE INVENTION

Figure 1:
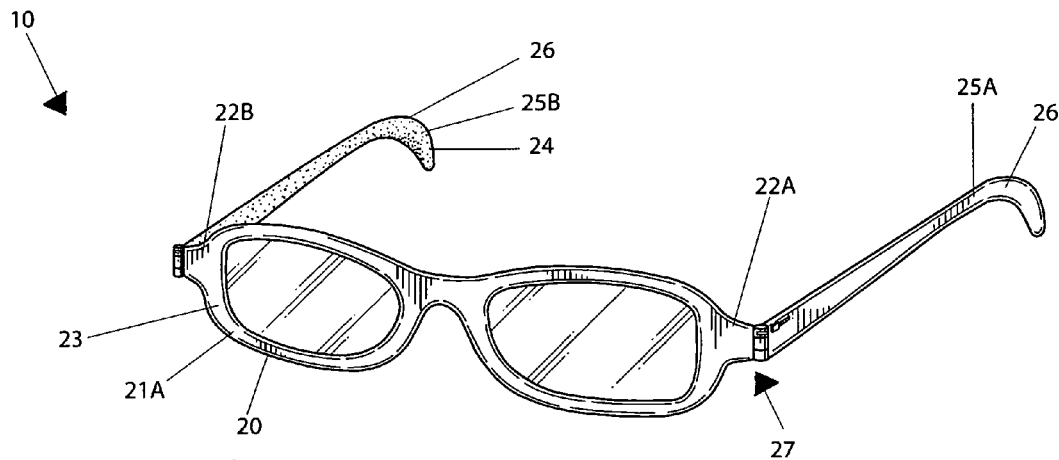
FIG. 1 is a perspective view showing a first side of a modular eyeglass frame, in accordance with the present invention.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures.

The device of this invention is referred to generally in FIGS. 1-5 by the reference numeral 10 and is intended to provide a modular eyeglass frame. It should be understood that the device 10 may be used to selectively alter the appearance of the eyeglass frames for many different reasons and should not be limited in use to the applications mentioned herein. Since it is produced in an array of colors and styles, users enjoy interchanging several pairs of the present invention to correspond with particular outfits, occasions and moods. Being fully reversible, a pair of professional looking eyewear can be worn to the office or an important business meeting and with a simple manipulation of the ear pieces is flipped to reveal a fun design perfect for cocktails or an evening out with friends. Since it is simple to use, users appreciate the ease with which their frames are reversed. Of course, it is noted that the lenses are not polarized or prescribed for altering vision due to the reversal features of the present invention.

Figure 2:
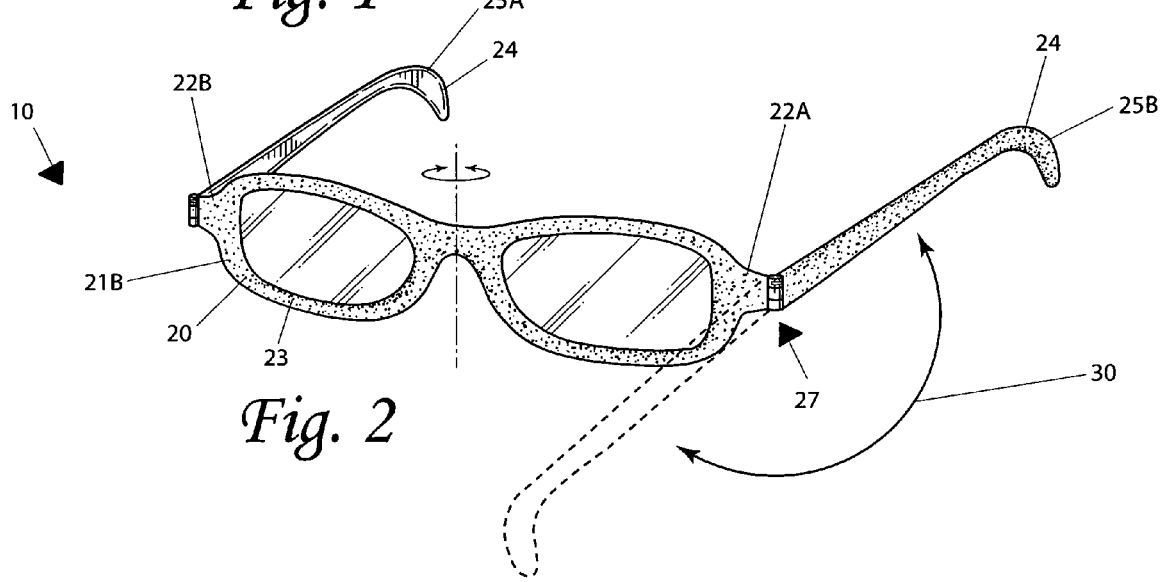
FIG. 2 is a perspective view showing a second side of the modular eyeglass frame for demonstrating reversible and interchangeable handles.
Figure 3:
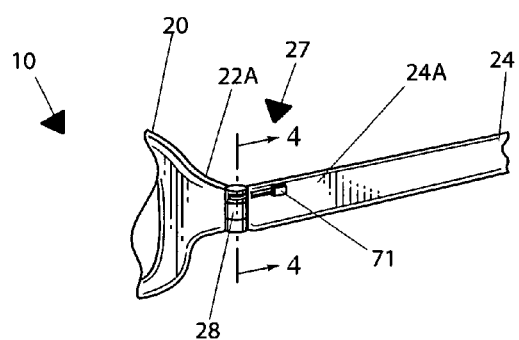
FIG. 3 is a partial side elevational view of the interchangeably connecting mechanism.

Referring initially to FIGS. 1-3, a modular eyeglass frame 10 for allowing a user to selectively alter the appearance thereof may preferably include a lens frame 20. Such a lens frame 20 may have oppositely facing first 21A and second 21B sides spanning along an entire longitudinal length of the lens frame 20 respectively and terminating at oppositely disposed first 22A and second 22B lateral ends of the lens frame 20 respectively. Each of such first 21A and second 21B sides may include unique surface indicia 23 displayed thereon respectively. Surface indicia may include a variety of colors and stylized designs as well as licensed logos or trademarks, as is known to one skilled in the art.

The modular eyeglass frame 10 may also include a plurality of elongated handles 24. Each of such elongated handles 24 may feature oppositely facing first 25A and second 25B sides spanning along an entire longitudinal length of the handles 24 respectively. It should be noted that the handles 24 may be interchangeable. For this reason, each handle is interchangeably referred to with the reference numeral 24. Each of the first 25A and second 25B sides of the handles 24 preferably includes unique surface indicia 26 displayed thereon respectively. Similar to the surface indicia 23 displayed on each side of the lens frame 20, the surface indicia 26 displayed on each side of the handles 24 may also include a variety of colors and stylized designs as well as licensed logos or trademarks, as is known to one ordinarily skilled in the art.

The modular eyeglass frame 10 may be selectively morphed between a plurality of modes defined by alternate combinations of the unique surface indicia associated with the lens frame 20 and the handles 24 respectively. Referring to FIGS. 1-5, the modular eyeglass frame 10 may include a mechanism 27 for interchangeably connecting each of the handles 24 to each of the first 22A and second 22B lateral ends of the lens frame 20 respectively which is vital such that the unique surface indicia 23 of each of the first 21A and second 21B sides of the lens frame 20 may be selectively coordinated with the unique surface indicia 26 of each of the first 25A and second 25B sides of the handles 24 respectively. For example, the user may obtain a lens frame 20 and handles 24 that features a conservative design on the first sides 21A, 25A and a more extravagant design on the second sides 21B, 25B. The user may thus employ the first sides 21A, 25A side to create a more professional appearance and may employ the second side 21B, 25B to create a more relaxed appearance.

The user may further configure the modular eyeglass frame 10 by matching the first side 21A of the lens frame 20 with the second sides 25B of the handles 24 in order to better meet their fashion needs. It should be noted that the interchangeably connecting mechanism 27 is preferably included on each of the first 22A and second 22B lateral ends of the lens frame 20. Thus, one skilled in the art will understand that any reference to the interchangeably connecting mechanism attached to one of the lateral ends, shall also be true the other lateral end of the handles.

Referring to FIGS. 3-5, the interchangeably connecting mechanism 27 preferably includes a coupling 28 which is advantageously attached to a corresponding proximal end 24A of a first one of the handles 24. Such a coupling 28 preferably includes a cylindrical cam 29 formed at a leading end thereof. Such a cam 29 may be directly and rotatably abutted against the first lateral end 22A of the lens frame 20 as the first handle 24 is biased along the first arcuate path 30 to thereby prevent the first handle 24 from undesirably deviating away from the fulcrum pivot axis 31 during full rotation. The combination of the cam 29 abutting against the first lateral end 22A of the lens frame 20, as claimed, secures the coupling 28 by aligning the coupling 28 with the fulcrum pivot axis 31 and preventing undesirable oscillating movement away from the fulcrum axis 31.

Referring to FIGS. 3-5, the interchangeably connecting mechanism 27 may further include a first plurality of deformably resilient helical spring members 32. Such a first plurality of spring members 32 may include first ends 32A statically mated directly without the use of intervening elements to the coupling 28 respectively. The first plurality of spring members 32 may also include second ends 32B and follow mutually exclusive compression paths. A plurality of bearings 34 may be fixedly attached to second ends 32B of the first plurality of spring members 32 respectively.

Referring to FIGS. 3-5, the interchangeably connecting mechanism 27 may further include a plurality of receiving blocks 35A, 35B. Such receiving blocks 35 may be attached directly without the use of intervening elements to the first lateral end 22A of the lens frame 20 respectively. Each of the receiving blocks 35A, 35B may feature a socket 36 formed in an inner wall thereof. The bearings 34 may be slidably interfitted into the sockets 36 when the coupling 28 is intercalated between the receiving blocks 35A, 35B which is necessary so that the first handle 24 is freely rotated about a fulcrum pivot axis 31 juxtaposed parallel to the first lateral end 22A of the lens frame 20.

The spring members 32 are suitably calibrated to exert equal and opposite linear forces when compressed such that the bearings 34 advantageously maintain frictional surface contact with the sockets 36 and thereby prevent the coupling 28 from disengaging the first lateral end 22A of the lens frame 20. This feature overcomes a problem associated with prior art examples wherein with the present invention, there is no requirement for additional removable parts such as pins that may be easily lost, thereby overcoming such shortcomings.

Referring to FIGS. 3-5, the interchangeably connecting mechanism 27 may further include a locking arm 37. Such locking arm 37 may preferably be retractably engaged with the proximal end 24A of the first handle 24. The locking arm 37 may also be reciprocated along a linear path 38 oriented perpendicular to mutually exclusive compression paths of the spring members respectively 32. The locking arm 37 may further be mated with an auxiliary spring member 70. Such an auxiliary spring member 70 is preferably resiliently compressible along a linear path defined orthogonal to the fulcrum pivot axis. A tab 71 may be statically affixed to the locking arm. Such a tab 71 may extend to the exterior of handle 24 so that locking arm 37 may be retracted into the arm with the tab 71. The locking arm 37 preferably exerts an opposing force acting against a corresponding one of the linear forces of the spring members 32 and thereby prohibits the coupling 28 from prematurely disengaging the receiving blocks 35A, 35B. The combination of such elements, as claimed, locks the handles 24 into the lens frame 20 thus securing the modular eyeglass frame 10 onto the user's person.

Referring to FIGS. 3-5, the interchangeably connecting mechanism 27 may further include a groove 39 formed along a lateral perimeter of a first one of the receiving blocks 35A. Such a groove 39 may be axially aligned with the locking arm 37 such that the locking arm 37 is interfitted inside the groove 39 when the coupling 28 is interfitted between the receiving blocks 35A, 35B. The locking arm 37 provides additional reinforcement to the handles 24 so that each handle 24 does not deviate from the fulcrum axis 31 during rotation. The grooves 39 provide stability and flexibility by ensuring the first handle 24 does not deviate from the fulcrum axis 31 while rotating along the first arcuate path 30

Referring to FIGS. 3-5, the first receiving block 35A may be pivotally attached to the first lateral end 22A of the lens frame 20. The first receiving block 35A may also be freely pivotal between open and closed positions along a second arcuate path 72 when the locking arm 37 is disengaged from the groove 39 and thereby permitting a first one of the spring members 32' to expand to equilibrium such that a first one of the bearings 34' disengages from the first receiving block 35A. A second receiving block 35B may be statically and fixedly connected to the first lateral end 22A of the lens frame 20. The combination of the first receiving block 35A being freely pivotal between open and closed positions provide an unexpected benefit, wherein the user may conveniently disengage the first handle 24 from the lens frame 20 with out damaging any part of the interchangeably connecting mechanism 27, thereby solving such problems with prior art devices.

In use, a method for allowing a user to selectively alter an appearance of the modular eyeglass frame 10 may include the first step of providing a lens frame 20 with oppositely facing first 21A and second 21B sides spanning along an entire longitudinal length of the lens frame 20 respectively and terminating at oppositely disposed first 22A and second 22B lateral ends of the lens frame 20 respectively. Each of the first 21A and second 21B sides may also include unique surface 23 indicia displayed thereon respectively. The method may include a second step of providing a plurality of elongated handles 24. Each of the elongated handles 24 may have oppositely facing first 25A and second 25B sides spanning along an entire longitudinal length of the handles 24 respectively. Each of the first 25A and second 25B sides of the handles 24 including unique surface indicia 26 displayed thereon respectively.

In use, the method may further include a third step of selectively morphing the appearance of the modular eyeglass frame 10 between a plurality of modes. Each mode is preferably defined by alternate combinations of the unique surface indicia 23, 26 associated with the lens frame 20 and the handles 26 performing the following step of interchangeably connecting each of the handles 24 to each of the first 22A and second 22B lateral ends of the lens frame 20 respectively so that the unique surface indicia 23 of each of the first 22A and second 22B sides of the lens frame 20 is selectively coordinated with the unique surface indicia 26 of each of the first 25A and second 25B sides of the handles 24 respectively.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A modular eyeglass frame for allowing a user to selectively alter an appearance thereof, said modular eyeglass frame comprising:

a lens frame having oppositely facing first and second sides spanning along an entire longitudinal length of said lens frame respectively and terminating at oppositely disposed first and second lateral ends of said lens frame respectively, each of said first and second sides including unique surface indicia displayed thereon respectively;

a plurality of elongated handles each having oppositely facing first and second sides spanning along an entire longitudinal length of said handles respectively, each of said first and second sides of said handles including unique surface indicia displayed thereon respectively; and means for interchangeably connecting each of said handles to each of said first and second lateral ends of said lens frame respectively such that said unique surface indicia of each of said first and second sides of said lens frame is selectively coordinated with said unique surface indicia of each of said first and second sides of said handles respectively.

2. The modular eyeglass frame of claim 1, wherein said interchangeably connecting means comprises:

a coupling attached to a corresponding proximal end of a first one of said handles;

a first plurality of deformably resilient helical spring members having first ends statically mated directly to said coupling respectively;

a plurality of bearings fixedly attached to second ends of said first plurality of spring members respectively; and a plurality of receiving blocks attached directly to said first lateral end of said lens frame respectively, each of said receiving blocks having a socket formed in an inner wall thereof;

wherein said bearings are slidably interfitted into said sockets when said coupling is intercalated between said receiving blocks such that said first handle is freely rotated about a fulcrum pivot axis juxtaposed parallel to said first lateral end of said lens frame.

3. The modular eyeglass frame of claim 2, wherein said interchangeably connecting means further comprises:

a locking arm retractably engaged with said proximal end of said first handle and being reciprocated along a linear path oriented perpendicular to mutually exclusive compression paths of said spring members respectively;

an auxiliary spring member mated to said locking arm and being resiliently compressible along a linear path defined orthogonal to said fulcrum pivot axis; and a groove formed along a lateral perimeter of a first one of said receiving blocks respectively, said groove being axially aligned with said locking arm such that said locking arm is interfitted inside said groove when said coupling is interfitted between said receiving blocks;

wherein said spring members are suitably calibrated to exert equal and opposite linear forces when compressed such that said bearings maintain frictional surface contact with said sockets and thereby prevent said coupling from disengaging said first lateral end of said lens frame.

4. The modular eyeglass frame of claim 3, wherein said locking arm exerts an opposing force acting against a corresponding one of said linear forces of said spring members and thereby prohibit said coupling from prematurely disengaging said receiving blocks.

5. The modular eyeglass frame of claim 3, wherein said first receiving block is pivotally attached to said first lateral end of said lens frame, said first receiving block being freely pivotal between open and closed positions when said locking arm is disengaged from said groove and thereby permitting a first one of said spring members to expand to equilibrium such that a first one of said bearings is disengaged from said first receiving block.

6. The modular eyeglass frame of claim 3, wherein a second one of said receiving blocks is statically and fixedly connected to said first lateral end of said lens frame.

7. The modular eyeglass frame of claim 2, wherein said coupling further comprises:

a cylindrical cam formed at a leading end thereof, said cam being directly and rotatably abutted against said first lateral end of said lens frame as said first handle is biased along said first arcuate path to thereby prevent said first handle from undesirably deviating away from said fulcrum pivot axis during rotation.

8. A modular eyeglass frame for allowing a user to selectively alter an appearance thereof, said modular eyeglass frame comprising:

a lens frame having oppositely facing first and second sides spanning along an entire longitudinal length of said lens frame respectively and terminating at oppositely disposed first and second lateral ends of said lens frame respectively, each of said first and second sides including unique surface indicia displayed thereon respectively;

a plurality of elongated handles each having oppositely facing first and second sides spanning along an entire longitudinal length of said handles respectively, each of said first and second sides of said handles including unique surface indicia displayed thereon respectively; and means for interchangeably connecting each of said handles to each of said first and second lateral ends of said lens frame respectively such that said unique surface indicia of each of said first and second sides of said lens frame is selectively coordinated with said unique surface indicia of each of said first and second sides of said handles respectively;

wherein said modular eyeglass frame is selectively morphed between a plurality of modes defined by alternate combinations of said unique surface indicia associated with said lens frame and said handles respectively.

9. The modular eyeglass frame of claim 8, wherein said interchangeably connecting means comprises:

a coupling attached to a corresponding proximal end of a first one of said handles;

a first plurality of deformably resilient helical spring members having first ends statically mated directly to said coupling respectively;

a plurality of bearings fixedly attached to second ends of said first plurality of spring members respectively; and a plurality of receiving blocks attached directly to said first lateral end of said lens frame respectively, each of said receiving blocks having a socket formed in an inner wall thereof;

wherein said bearings are slidably interfitted into said sockets when said coupling is intercalated between said receiving blocks such that said first handle is freely rotated about a fulcrum pivot axis juxtaposed parallel to said first lateral end of said lens frame.

10. The modular eyeglass frame of claim 9, wherein said interchangeably connecting means further comprises:

a locking arm retractably engaged with said proximal end of said first handle and being reciprocated along a linear path oriented perpendicular to mutually exclusive compression paths of said spring members respectively;

an auxiliary spring member mated to said locking arm and being resiliently compressible along a linear path defined orthogonal to said fulcrum pivot axis; and a groove formed along a lateral perimeter of a first one of said receiving blocks respectively, said groove being axially aligned with said locking arm such that said locking arm is interfitted inside said groove when said coupling is interfitted between said receiving blocks;

wherein said spring members are suitably calibrated to exert equal and opposite linear forces when compressed such that said bearings maintain frictional surface contact with said sockets and thereby prevent said coupling from disengaging said first lateral end of said lens frame.

11. The modular eyeglass frame of claim 10, wherein said locking arm exerts an opposing force acting against a corresponding one of said linear forces of said spring members and thereby prohibit said coupling from prematurely disengaging said receiving blocks.

12. The modular eyeglass frame of claim 10, wherein said first receiving block is pivotally attached to said first lateral end of said lens frame, said first receiving block being freely pivotal between open and closed positions when said locking arm is disengaged from said groove and thereby permitting a first one of said spring members to expand to equilibrium such that a first one of said bearings is disengaged from said first receiving block.

13. The modular eyeglass frame of claim 10, wherein a second one of said receiving blocks is statically and fixedly connected to said first lateral end of said lens frame.

14. The modular eyeglass frame of claim 9, wherein said coupling further comprises:

a cylindrical cam formed at a leading end thereof, said cam being directly and rotatably abutted against said first lateral end of said lens frame as said first handle is biased along said first arcuate path to thereby prevent said first handle from undesirably deviating away from said fulcrum pivot axis during rotation.

15. A method for allowing a user to selectively alter an appearance of a modular eyeglass frame, said method comprising the chronological steps of:

a. providing a lens frame having oppositely facing first and second sides spanning along an entire longitudinal length of said lens frame respectively and terminating at oppositely disposed first and second lateral ends of said lens frame respectively, each of said first and second sides including unique surface indicia displayed thereon respectively;

b. providing a plurality of elongated handles each having oppositely facing first and second sides spanning along an entire longitudinal length of said handles respectively, each of said first and second sides of said handles including unique surface indicia displayed thereon respectively;

c. selectively morphing an appearance of said modular eyeglass frame between a plurality of modes defined by alternate combinations of said unique surface indicia associated with said lens frame and said handles performing the following step:

i. interchangeably connecting each of said handles to each of said first and second lateral ends of said lens frame respectively such that said unique surface indicia of each of said first and second sides of said lens frame is selectively coordinated with said unique surface indicia of each of said first and second sides of said handles respectively.

\* \* \* \* \*